No. 693,545. Patented Feb. 18, 1902.
P. JACOBSEN.
EXPANSION PULLEY.
(Application filed July 5, 1901.)
(No Model.) 4 Sheets—Sheet 2.
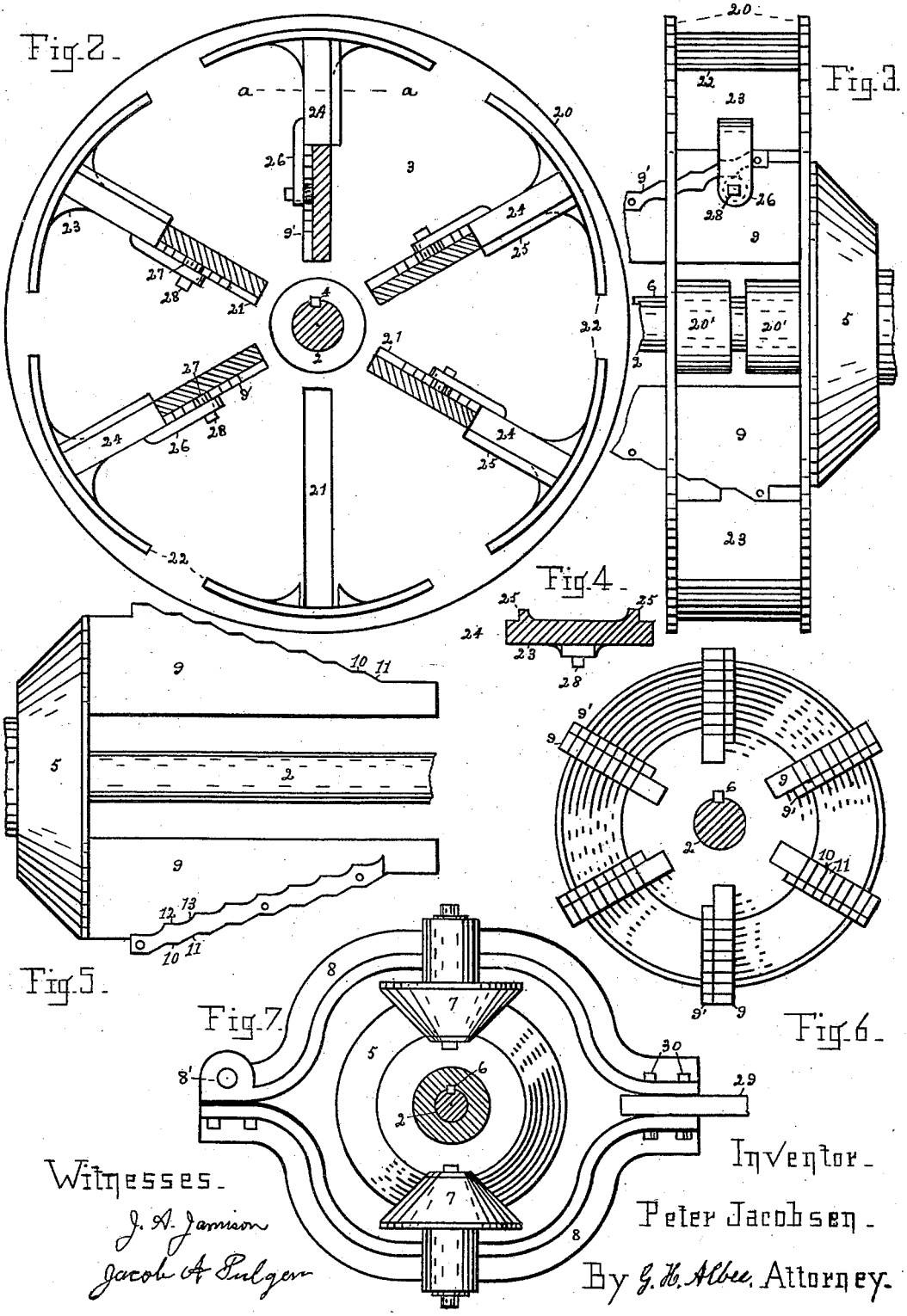
Witnesses
J. A. Jamison
Jacob A. Pulger
Inventor
Peter Jacobsen
By G. H. Albee, Attorney.

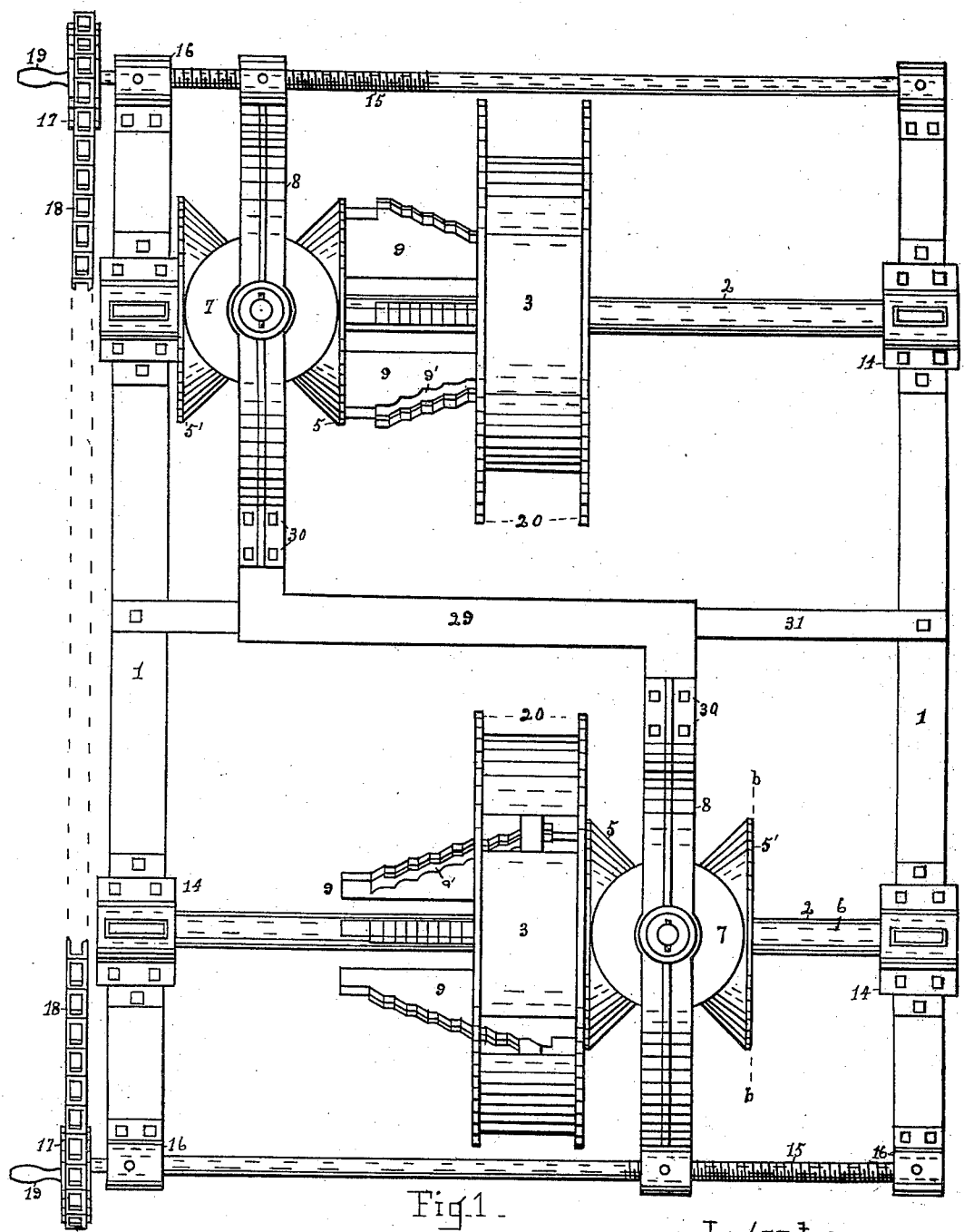

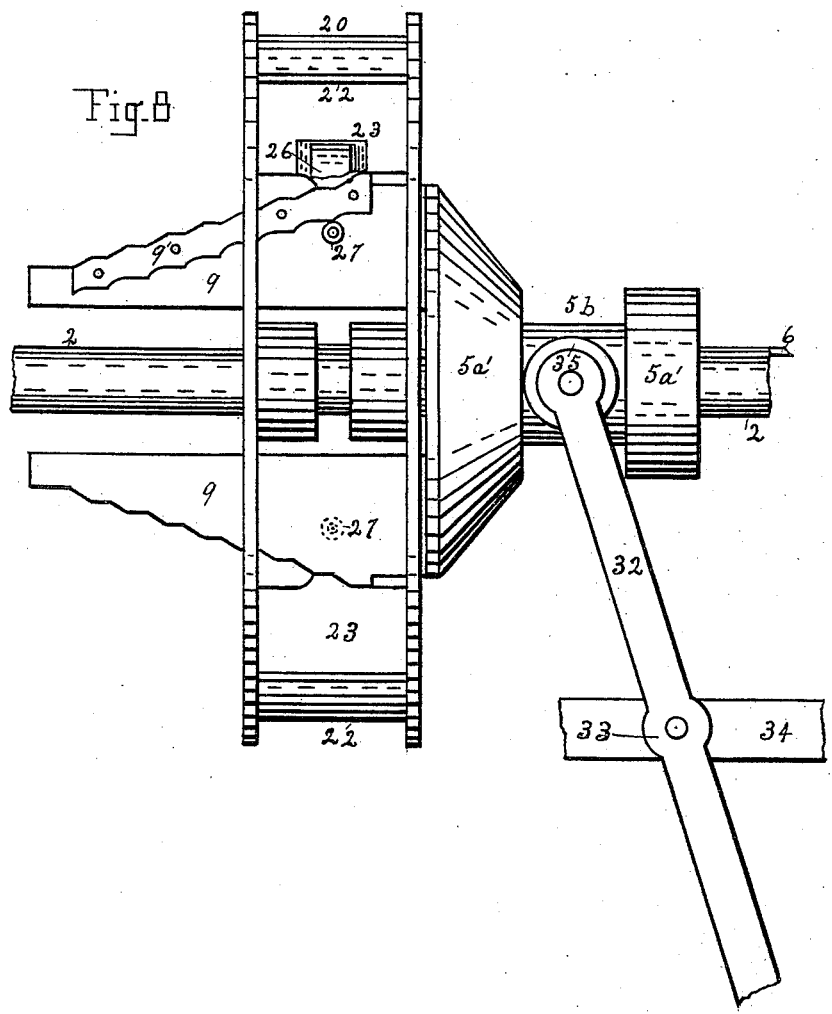

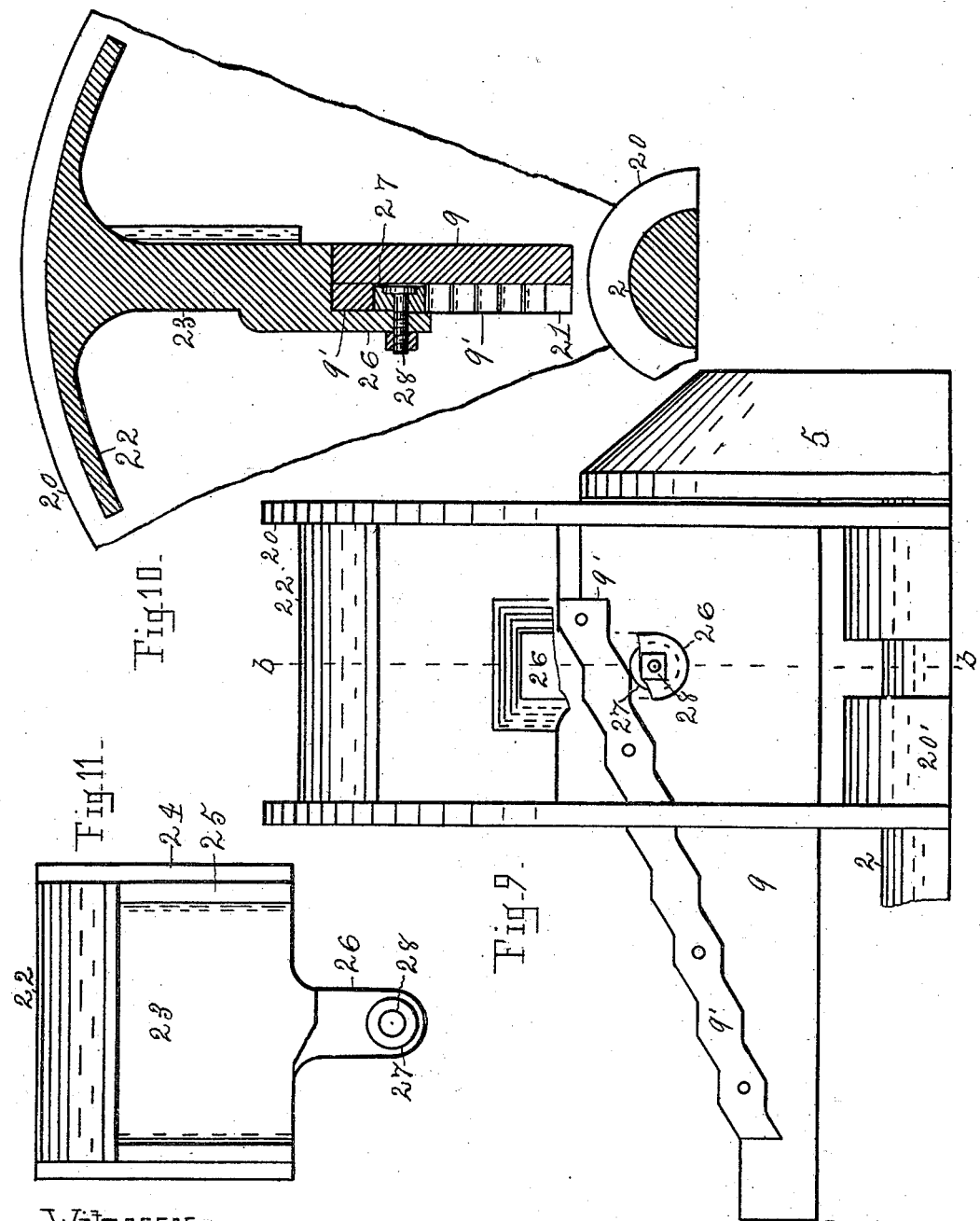

UNITED STATES PATENT OFFICE.

PETER JACOBSEN, OF NEENAH, WISCONSIN.

EXPANSION-PULLEY.

SPECIFICATION forming part of Letters Patent No. 693,545, dated February 18, 1902.

Application filed July 5, 1901. Serial No. 67,085. (No model.)

*To all whom it may concern:*

Be it known that I, PETER JACOBSEN, a citizen of the United States, residing at Neenah, in the county of Winnebago and State of Wisconsin, have invented a new and useful Improvement in Expansion-Pulleys, of which the following is a specification.

My invention relates to an expansion-pulley formed of several segments, each of which is provided with an arm which is arranged to slide radially in grooves between circular plates or disks which are firmly secured to a shaft, one on each side of the rim-segments, said rim-segments being movable radially out or in by means of a collar or other body slidingly mounted upon said shaft, the collar or other body being provided with arms, one to each pulley-segment, which extend from it in a direction parallel with said shaft and are provided upon their outer edges with horizontal and inclined spaces alternately which are arranged to engage the arms of the pulley-segments for expanding all of the pulley-segments simultaneously when said collar is moved toward them, and they are also provided with spaces of a suitable form alternately arranged for engaging a roller which is mounted to revolve inside of said latter spaces and to thereby contract said pulley-segments when said collar is moved from them.

It further relates to mechanism for sliding said collar and pulley-expanding arms; and the object of my improvements is to produce an expansion-pulley which can be expanded or contracted while running as well as when idle and one in which its diameter when adjusted for transmitting the desired speed will so remain without any tendency to become smaller by reason of the pull of the belt thereon, thereby causing a continual friction between the expanding devices and the shifting mechanism thereof, and, further, to produce a shifting device which is powerful and can be operated without stopping the revolutions of the pulley for changing the speed in any machine to which they may be applied. The mechanism for accomplishing these objects is shown in the accompanying drawings, in which—

Figure 1 is a plan showing two pulleys arranged upon short shafts for transmitting power at varying speeds, one of the pulleys being expanded to its largest limit and the other one is contracted to its smallest diameter, and also showing a plan of and arrangement of the mechanism for producing said variations in their diameter. Fig. 2 is an end view of a pulley expanded to its largest diameter and secured upon a shaft, one of its end plates being removed for showing the construction of its parts and the arms of its sliding-collar expanding device being shown in section, one of said arms and the arm of the pulley-segment for that place being omitted for showing the arrangement of the radial grooves in the end plates of the pulley. Fig. 3 is a side elevation of said pulley and shaft, but showing only two of its opposite arms and two opposite arms of its sliding-collar pulley-expanding device, the arms of the latter extending out from a beveled-face antifriction-roller which is formed of the sliding collar heretofore mentioned, the companion beveled-face roller and the smaller end of the arms of said sliding body being broken away. Fig. 4 is a section across one of the pulley-arms upon the line *a a* of Fig. 2. Fig. 5 is a side elevation of a beveled-face antifriction-roller upon a shaft, which in its application to the pulley here shown has six arms, only two of its opposite ones being here shown. Fig. 6 is an end view of the small end of the latter figure. Fig. 7 is an elevation showing the antifriction-rollers 5 and 7 in their frame upon the line *b b* of Fig. 1, the roller which said line crosses being omitted. Fig. 8 is a side elevation of the pulley shown in Fig. 2, but showing only two of its opposite arms and two opposite arms of its sliding-collar pulley-expanding device, the arms of the latter extending out from a sliding collar having a wide groove in its circumference, in which groove a shifting-lever is arranged to swing and engage either side of said groove for shifting the collar and its pulley expanding and contracting arms, the lever being suitably fulcrumed on a support. Fig. 9 is a side elevation showing the upper half of the parts shown in Fig. 3. Fig. 10 is a vertical section, upon the line *b b* of Fig. 9, of the parts shown therein as seen in looking toward the left. Fig. 11 is an elevation showing the rear side of the pulley-segment which is shown in the upper part of Fig. 9. Figs. 1 and 7 are upon the same scale, Figs. 2, 3, 4, 5, 6, and 8 upon a larger scale, and Figs. 9, 10, and 11 upon a still larger one.

Similar numerals indicate like parts in the several views.

1 indicates the side pieces of a frame which carry the journal-boxes of the mechanism shown; 2, shafts carrying each an expansion-pulley and its accompanying mechanism; 3, an expansion-pulley keyed to the shaft 2 with a key 4; 5 5', beveled-face antifriction-rollers slidingly mounted upon the shaft 2 and held from turning around thereon by the spline 6; 5ª', a collar shown in Fig. 8 and having a wide groove 5ᵇ around its circumference for adapting the collar to receive a shifting-lever and showing a modified form of shifting device from that shown in Figs. 1 and 7; 7, antifriction-rollers for engaging with the rollers 5 and 5' and shifting them in their position upon the shaft 2; 8, frames carrying the rollers 7; 9, arms integral with or firmly secured to the rollers 5 or 5ª' and extending parallel with the shaft 2 from the large end of said rollers; 9', a bracket-piece riveted to the outer edge of each arm 9; 10 and 11, horizontal and inclined spaces, respectively, alternately arranged upon the outer edges of each of the arms 9 and its bracket 9'; 12 and 13, horizontal and curved spaces, respectively, alternately arranged upon the inner side or edge of the brackets 9'; 14, journal-boxes carrying shafts 2; 15, screw-threaded rods mounted in journal-boxes 16 and engaging the frames 8 through the threaded apertures 8' for moving the frames and operating the expanding and contracting device of the pulleys; 17, sprocket-wheels, one on each shaft or rod 15; 18, a chain connecting said wheels; 19, handles in the wheels by which to turn them; 20, end plates or disks, one at each end of the pulley-rim sections; 20', the hubs of said plates; 21, slots arranged radially in said plates, one for each pulley-segment arm; 22, the pulley-rim sections; 23, arms, one to each rim-section, having tenons 24 for entering the slots 21 in plates 20; 25, shoulders upon the tenons for guiding the arms within the slots; 26, a wing extending in a radial direction from each pulley-arm and carrying a roller 27 for engaging the inner edge of the bracket 9'; 28, a bolt in the wing 25, upon which the roller is arranged to revolve; 29, an angular-shaped bar to which the antifriction-roller frames 8 are connected with bolts 30; 31, a bar extending across the frame side pieces for assisting in supporting the shifting frames and their rollers; 32, a lever for engaging the sides of the groove 5ᵇ; 33, the point at which said lever is fulcrumed; 34, a support upon which the lever 32 is pivoted, and 35 a friction-roller in one end of said lever.

The pulley-rim is composed of several sections, according to its diameter—in the present case six are shown—each one consisting of a rim, an arm having tenons for engaging the radial slots in the plates 20, shoulders 25 for guiding the arm in its radial movement, and the wing 26, carrying roller 27 for engaging with the alternately-arranged horizontal and curved spaces of the bracket-pieces 9'.

It will be observed that the device for expanding and contracting the diameter of the pulley comprises arms arranged to slide along the same shaft upon which the end plates are keyed and through the slots in said plates, they being kept from turning around upon the shaft by means of a spline. The outer edges of said arms consist of alternately-arranged horizontal and inclined spaces which engage corresponding spaces upon the pulley-arms. (Shown in Fig. 8.) By moving these arms toward the pulley-arms the latter will be pushed outward by reason of the inclined spaces aforesaid and the pulley made larger. The normal position for the horizontal and inclined spaces upon the sliding arms and pulley-arms is in contact one with the other. When in that position, there is no tendency for the pulley to become smaller by reason of the pull of the belt thereon, a flat surface is presented upon the sliding arm 9, upon which the flat surface upon the end of the pulley-arm can rest, and as the pressure caused by the belt-pull acts normally to this surface there is no force tending to move the arms along the shaft. Until the two inclined spaces of the sliding arm and pulley-arm are brought into contact there will be no tendency of displacement between said parts, and no cause for end thrust in the shifting mechanism while the pulley is in use can arise. Part of the outer edge of said sliding arms consists of a bracket-piece 9', which is riveted to said arm, and upon its outer edge it corresponds in form with the form of the edge of the arm to which it is secured; but upon the inner edge of the bracket-piece it consists of alternately-arranged horizontal and curved spaces for engaging the roller 27, said roller being for both retaining the pulley-arms in their proper position against their centrifugal tendency and for contracting the diameter of the pulley when the sliding arms 9 are moved away from the pulley-arms.

It may be noted that the sliding arms 9, having the alternately-arranged straight and inclined surfaces, are adapted for expanding the arms of pulleys not provided with the end plates, as herein shown, but having a hub with radial arms, as is common in pulleys. It may be further noted that the collar 5ª' shows a beveled face similar to the faces of the rollers 5 and 5', which engage with the beveled faces of the rollers 7, but the bevel upon the collar 5ª' is for no other purpose than to provide the necessary room for the swing of the shifting lever 32 and to give the required strength to said collar.

The shifting mechanism shown consists of two sets of beveled-face antifriction-rollers, four in each set; but other devices may sometimes be successfully used, as in very light pulleys for transmitting but little power the usual shifting lever commonly used in clutches (shown in Fig. 8) and consisting of the lever 32 and grooved collar 5ᵃ may give fairly good results. This lever may be provided with the roller 35, if desired. The friction-surface of two in each set of these rollers, those of the rollers 7, may be of paper and be made in the usual manner of making paper friction-pulleys and the rollers 5 5' be cast together in one piece of a suitable metal.

The operation of the mechanism is as follows: Two expansion-pulleys being arranged upon shafts, as shown in Fig. 1, and connected together with a belt, power can be applied to or delivered from either shaft, as may be desired. A change in the speed to a slower rate to be delivered from the smallest of the two pulleys being desired, the operators take hold of the handles 19 on the sprocket-wheels and turn the screw-rods 15 in the direction for moving the shifting device toward the right. This movement will make the small pulley larger and the large one smaller, while preserving substantially the same length of belt. Should it then be desired to make the small one smaller and the large one larger, by reversing the direction of the rods 15 the arms 9 will be moved toward the left and the arms of the pulley operated upon for producing that result.

Having described my invention, what I claim, and desire to secure by Letters Patent, is—

1. An expansion-pulley comprising two circular end plates having corresponding radial slots therein, a series of pulley-rim segments, each one being provided with an arm having tenons adapted to enter and slide in said slots, each arm being provided with an anti-friction-roller suitably mounted for revolution, and a collar, or similar body adapted to be slidingly mounted upon the same shaft as said pulley and to enter the aforesaid radial slots, and having arms, one for each pulley-segment, extending therefrom in a direction parallel with said shaft, said arms being provided upon their outer edges with alternately-arranged horizontal and inclined spaces which are adapted to engage corresponding spaces upon the pulley-arms and to expand the diameter of said pulley when said sliding arms are moved horizontally in one direction, and said sliding arms being also provided with alternately-arranged spaces adapted to be engaged by the roller aforesaid and to contract the diameter of said pulley when said sliding arms are moved in the reverse direction, substantially as described.

2. In an expansion-pulley composed of a series of rim-segments having each an arm radially arranged for sliding upon a suitable support and being provided with an anti-friction-roller suitably mounted for revolution, a device for expanding and contracting the diameter of said pulley, consisting of a body adapted to be slidingly mounted upon the same shaft as said pulley, and having a series of arms, one for each pulley-arm, arranged parallel with said shaft and having their outer edges formed of alternately-arranged horizontal and inclined spaces adapted to engage corresponding spaces upon the pulley-arms and to expand the diameter of said pulley when said sliding arms are moved in one direction, said sliding arms being also provided with spaces alternately arranged and adapted to be engaged by the aforesaid roller and to thereby contract the diameter of said pulley when said sliding arms are moved in the reverse direction, substantially as described.

PETER JACOBSEN.

Witnesses:
J. A. JAMISON,
JACOB A. PULGER.